Jan. 31, 1967 J. W. KLUVER 3,302,120

LOW NOISE LASER AMPLIFIER WITH PLURAL SECTIONS
RESPECTIVELY BETWEEN CONFOCALLY SPACED
FOCUSERS WITH SCREENS

Filed May 23, 1965

INVENTOR
J. W. KLÜVER
BY
Kenneth W. Mateer
ATTORNEY 3,302,120
Patented Jan. 31, 1967

3,302,120

LOW NOISE LASER AMPLIFIER WITH PLURAL SECTIONS RESPECTIVELY BETWEEN CONFOCALLY SPACED FOCUSERS WITH SCREENS

Johan Wilhelm Kluver, Berkeley Heights, N.J., assignor to Bell Telephone Laboratories, Inc., New York, N.Y., a corporation of New York Filed June 23, 1965, Ser. No. 466,265
5 Claims. (Cl. 330—4.3)

Figure 1:
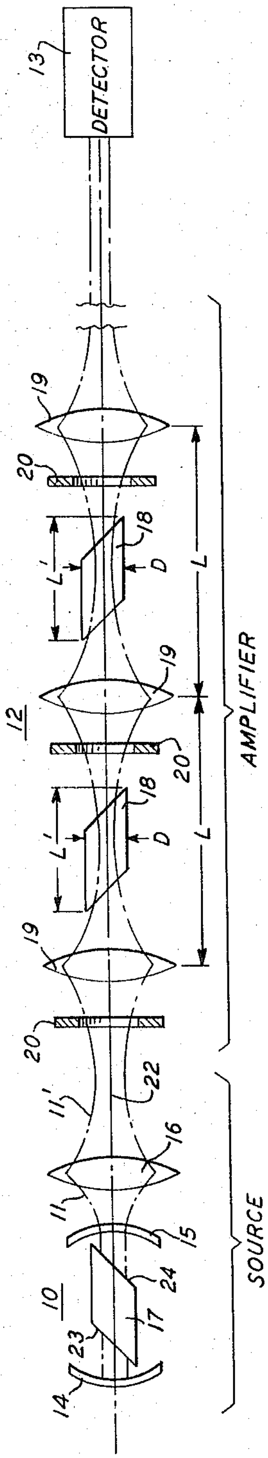

This invention relates to optical maser amplifiers and, more particularly, to optical maser amplifiers adapted to reduce the effects of noise.

The advent of the optical maser, or laser, has made possible the generation and amplification of electromagnetic wave energy in a frequency range which is termed the optical frequency range and which extends from the far infrared, through the visible, and into and through the ultraviolet portions of the electromagnetic spectrum. The availability of coherent wave energy at such high frequencies has made possible communication systems in which enormous amounts of information can be simultaneously transmitted.

In nearly all communication systems, amplification is necessary both initially at the transmitter and periodically along the transmission path to ensure a reasonable path length over which the signal amplitude remains above the minimum level for detection.

A recurring problem in amplifiers is the introduction of noise by the system components. In many amplification systems, the noise level limits the information-carrying capacity. In optical maser arrangements, the information-carrying capacity can be improved by reducing the amount of noise introduced by the amplifier without at the same time significantly reducing the signal level.

The relative power levels of signal and noise, typically denoted as the signal-to-noise ratio, can be controlled over a considerable range in optical transmission systems by properly structuring the system components, as disclosed, for example, in the copending application of H. W. Kogelnik and A. Yariv, Serial No. 290,357, filed June 25, 1963, which issued on February 15, 1966, as U.S. Patent 3,235,813 and is assigned to the assignee of this application.

The predominant source of noise introduced in the transmission process of a transmission system of the Kogelnik-Yariv type is thermal generation. In the amplification process, however, the predominant noise source is essentially spontaneous emission within the active material. Accordingly, in optical amplifier arrangements, it is necessary to deal somewhat differently with the noise problem than in transmission systems.

It is therefore the object of the present invention to improve the signal-to-noise ratio in optical amplifiers.

In many applications it is desirable to use a laser amplifier as a preamplifier ahead of the detector. As is now well known, the gain of a gaseous laser is ordinarily inversely proportional to the tube diameter, and varies across the cross section of the tube. It is therefore desirable that the beam cross section within the amplification volume be kept optimally small in order that the transverse gain variation not distort unduly the propagating energy.

It is one aspect of the present invention that the effects of transverse gain variation in optical maser amplifiers are minimized.

A further important aspect of the invention relates to noise saturation. Often, in a high gain laser, the cumulative amplification of the spontaneously generated noise causes the amplifier to saturate, thereby introducing signal distortion and lowering the efficiency of the amplifier. The invention minimizes such noise saturation effects.

In accordance with the invention, the gain of a laser amplifier is distributed among a plurality of sections of active material interspersed among noise-mode-filtering combinations which are structured to ensure minimum beam diameter within the active medium.

According to a specific embodiment of the invention, an active medium appropriate for the stimulation of radiation of at least one signal frequency is associated with means for exciting the medium to stimulate emission of radiation at levels below the saturation level determined at least in part by noise spontaneously emitted by the medium. Transmitting means for radiation of the signal frequency, comprising a plurality of noise-filtering devices, segments the active medium at intervals appropriate with respect to the cumulative amplification introduced thereby to maintain the level of the stimulated radiation below the saturation level. In the preferred embodiment, each noise-filtering combination comprises a lens and aperture combination confocally disposed with respect to the next adjacent similar section.

The above and other objects and features of the invention, together with other attendant advantages, will become more readily apparent from a consideration of the accompanying drawing and detailed description thereof which follows.

Figure 3:
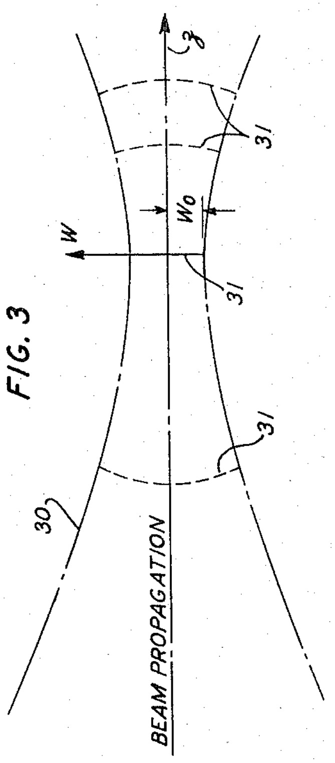
Figure 2:
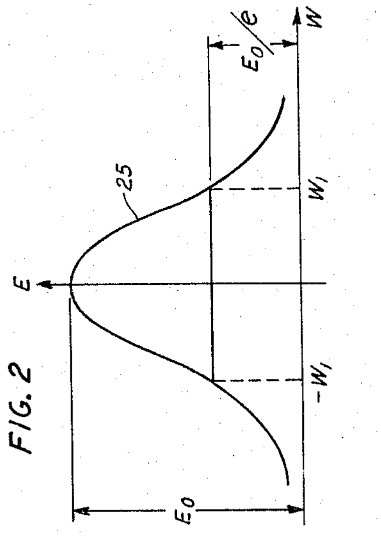

In the drawing:

FIG. 1 is a schematic view of an optical system incorporating a low noise amplifier in accordance with the invention; and FIGS. 2 and 3 are graphical plots helpful in understanding the invention.

Referring now in greater detail to FIG. 1, there is shown an optical system comprising a laser oscillator 10 emitting a signal beam 11 which passes through laser amplifier 12 and is ultimately incident upon a suitable optical detector 13. As shown, oscillator 10 comprises an optically resonant cavity formed by concave spherical reflecting end members 14, 15, of which reflector 15 is partially transmissive to permit abstraction of energy for external utilization. Focusing means 16 is positioned external to the cavity along the axis 22 of energy beam 11. Disposed within cavity 10 between reflectors 14, 15 is a laser medium indicated in FIG. 1 as rod-like member 17 with Brewster angle end surfaces 23, 24. The active medium, which can be any one of the many gaseous, liquid, and solid state media now known in the optical maser art, would have pump apparatus associated with it for producing therein the negative temperature condition requisite for optical maser operation. Since the nature of the pump apparatus is determined by the particular characteristics of the maser medium selected, illustration of the pump is omitted in the interest of clarity.

Radiation beam 11 comprises substantially solely the fundamental transverse mode associated with oscillator 10, which is operated, for example, in the manner reported by H. W. Kogelnik and W. W. Rigrod in volume 50 of the Proceedings of the IRE, page 220, February 1962. Such operation produces a beam having essentially the Gaussian beam distribution illustrated in FIG. 2, in which the amplitude E of the electric field strength is plotted as curved solid line 25 as a function of transverse distance $w$ across the beam, according to the methematical relation $$E = E_0 \exp\left(-\frac{W^2}{W_1^2}\right)$$

Maximum field strength $E_0$ occurs at the beam center with decreasing amplitude as the distance from center is increased. At the points $w=\pm w_1$, the beam amplitude has fallen to a value $E_0/e$, where $e$ is the base of natural logarithms. For the purposes of this specification, the width of the beam between those locations for which the beam amplitude equals $E_0/e$ will be defined as the spot size of the beam at any point along the axis of beam propagation. Thus, for a typical beam of circular cross section, beam spot size can be represented by a radius, which is equal to one-half the defined beam width.

A typical Gaussian beam such as beam 11 emitted by oscillator 10 of FIG. 1 is illustrated in detail in FIG. 3, in which beam 30 propagates symmetrically along and parallel to the $z$ axis, with a beam spot size minimum of $w_0$ at location $z=0$. As seen in FIG. 3, the spot size varies as a function of distance along $z$. A Gaussian beam is characterized by spherical wave fronts, or surfaces of constant phase, indicated by dashed lines 31, the radii of curvature of which decrease as the beam is traversed in either direction along $z$ away from the point $z=0$, at which the wave front has an infinite radius of curvature.

From the paper by Boyd and Gordon, volume 40 of the Bell System Technical Journal 489, 1961, the spot-size radius $w_1$ for the Gaussian beam of FIG. 3 at any point along the $z$ axis is defined by $$w_1=w_0\sqrt{1+\frac{\lambda^2 z^2}{\pi^2 w_0^4}} \qquad (1)$$

where $\lambda$ is the wavelength of the signal beam.

Returning now to FIG. 1, the Gaussian energy beam 11 from oscillator 10 emerges as transformed Gaussian beam 11' from lens 16, which comprises low loss optical material transparent to optical energy of the signal frequency, and is incident upon laser amplifier 12 which comprises a plurality of negative temperature media 18, substantially similar to medium 17 described with respect to oscillator 10. Since amplifying media 18 act in part as an inherent source of spontaneously generated noise, the level of noise at detector 13 will include a portion of the noise emitted by the amplifying media. In the past, in order to optimize the amplifier performance, it was believed necessary that a separate optical system be introduced following the amplification section to restrict undesired spontaneous noise to an acceptable level. In particular, a set of lenses with proper spacing and proper aperture of acceptance was distributed following the amplifier to filter the unwanted amplified noise. However, such an arrangement can be particularly excessive in length. In addition, high gain laser amplification could not fully be used due to amplifier saturation on its own noise. If, on the other hand, the diameter of the active medium was increased to lower the gain per unit length in order to avoid saturation, the beam spot size typically increased as the amplifier was lengthened to maintain high over-all gain. The increased spot size then introduced Gaussian mode distortion due to transverse gain variation within the area occupied by the larger beam. It is thus necessary to maintain the beam spot size at an acceptable minimum within the amplifier if gain distortion is to be prevented. In accordance with the present invention, the noise-filtering components on which beam spot size depends and the amplification sections are intermixed within a single repeater stage to produce improved operation of both. The term single repeater stage denotes that the various amplifying sections are closely spaced as opposed to remotely separated as, for example separated by more than a few feet. Each repeater stage will typically include at least two and as many as five amplifying sections, although four is the preferred number.

In FIG. 1, beam focusers, or lenses 19 are spaced between each of active media sections 18 in order properly to configure the beam. Since, for a given amplification length L, the volume of a Gaussian beam traversing that length is minimum when the beam focusers are confocal, lenses 19 are selected with a focal length equal to one-half their separation L. Associated with each of lenses 19, and positioned adjacent thereto, is an apertured screen 20 having an aperture size equal to or slightly less than the Gaussian beam spot size at the lenses 19. In accordance with Equation 1, the aperture radius is $$r_a=w_0\sqrt{1+\frac{\lambda_2 L^2}{4\pi^2 w_0^2}}\cong w_0\sqrt{2} \qquad (2)$$

Disposed between each pair of screen-lens combinations is an active medium section 18 of length L' and diameter D to amplify the signal energy in the Gaussian beam passing therethrough. As mentioned before, the amplification length L' is selected in accordance with the gain G' for each such section to maintain a margin between G' and the saturation gain $G_s'$ which is a parameter of the active medium, the amplification geometry, and other related quantities. Typically, optimum performance is obtained when G' is 80 percent of $G_s'$. In some arrangements, optimum signal-to-noise ratio can be obtained by adjusting the gain per section to increase section by section in the direction of wave travel. By cascading a plurality N of short high gain amplification sections and their associated noise filters, an over-all gain factor $G=NG'$ with exceptionally low noise (or high signal-to-noise ratio) can be obtained.

As a specific example, for a helium-xenon laser medium operating at 3.5 microns, gain G' in decibels per section is approximately equal to $4L'/D$ for L' in centimeters and D in millimeters. Thus for a cascade of four identical sections, with $L=30$ centimeters, and $L'=21$ centimeters, a maximum gain of 64 decibels with negligible gain variation across the Gaussian beam can be obtained.

In all cases it is understood that the above-described arrangement is only illustrative of the principles of the invention. Numerous and varied other arrangements can be devised in accordance with these principles by those skilled in the art without departing from the spirit and scope of the invention.

What is claimed is:

1. In an optical transmission system, between two and five amplifying sections sequentially arranged and spaced for forming a single repeater stage, each such section comprising an active medium appropriate for the stimulated emission of radiation of at least one frequency with means for pumping said medium, means for transmitting optical wave energy through said amplifying sections sequentially for the cumulative amplification of the optical energy, and a separate noise-filtering means comprising a lens with an associated apertured screen preceding each amplifying section, adjacent lenses being spaced confocally with one amplifying section being disposed on the beam axis between the lenses of each confocally spaced lens pair, said amplifiyng sections being disposed along a region including the minimum beam diameter.

2. A low noise optical amplification system comprising a source of coherent optical energy in a Gaussian beam configuration;

a single repeater stage comprising a plurality of confocally spaced adjacent beam focusers with an apertured screen associated with each focuser, means for applying said beam to said focusers in sequential fashion, and optical maser amplification sections comprising active media disposed in the path of said beam between each adjacent one of said confocal focusers;

and means for receiving said beam positioned at the output of the last of said focusers.

3. The amplification system according to claim 2 in which each of said sections has a saturation gain $G_S$, said media producing in each section a gain G which is less than $G_S$.

4. A low noise single repeater stage optical amplifier comprising a plurality of confocally spaced adjacent beam focusers with an apertured screen associated with each focuser, means for applying an optical maser beam to said focusers in sequential fashion, and optical maser amplification sections comprising active media disposed in the path of said beam between each of said confocally spaced focusers.

5. The amplifier according to claim 4 in which each of said sections has a saturation gain $G_S$, said media being proportioned to produce in each section a gain G which is less than $G_S$.

No references cited.

ROY LAKE, *Primary Examiner.*

D. R. HOSTETTER, *Assistant Examiner.*